(12) United States Patent
Xi et al.

(10) Patent No.: US 10,075,882 B2
(45) Date of Patent: Sep. 11, 2018

(54) METHOD AND APPARATUS FOR OBTAINING NEIGHBOR RELATIONSHIP BETWEEN NETWORK NODES AND NETWORK DEVICE

(71) Applicant: Huawei Technologies Co., Ltd., Shenzhen, Guangdong (CN)

(72) Inventors: Guobao Xi, Shanghai (CN); Yang Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 14/820,170

(22) Filed: Aug. 6, 2015

(65) Prior Publication Data
US 2015/0350970 A1    Dec. 3, 2015

Related U.S. Application Data

(63) Continuation of application No. PCT/CN2013/071494, filed on Feb. 7, 2013.

(51) Int. Cl.
*H04W 36/00* (2009.01)
*H04W 24/02* (2009.01)
*H04W 68/02* (2009.01)

(52) U.S. Cl.
CPC ....... *H04W 36/0061* (2013.01); *H04W 24/02* (2013.01); *H04W 68/02* (2013.01); *H04W 36/0083* (2013.01)

(58) Field of Classification Search
CPC . H04W 24/02; H04W 68/02; H04W 36/0061; H04W 36/0083
See application file for complete search history.

(56) References Cited

U.S. PATENT DOCUMENTS 8,472,539 B2    6/2013  Ko et al.
2004/0151193 A1*  8/2004  Rune ............... H04L 29/06
                                                    370/401

(Continued)

FOREIGN PATENT DOCUMENTS

CN    101790221 A    7/2010
CN    102045686 A    5/2011

(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.4.0, Dec. 2012, 284 pages.

*Primary Examiner* — Peter Chau (57) ABSTRACT

The present invention discloses a method and an apparatus for obtaining a neighbor relationship between network nodes, and a network device. The method includes: receiving a message sent by a network node; and parsing the message, to obtain a neighbor relationship between at least two network nodes involved in the message. The present invention further discloses a corresponding apparatus for obtaining a neighbor relationship between network nodes, and network device. According to the message sent by the network node, a core network learns the neighbor relationship between network nodes, and efficiency of performing a service between neighboring network nodes may be improved by using the neighbor relationship.

10 Claims, 6 Drawing Sheets

```
┌─────────────────────────────────────────────┐
│  Receive a message sent by a network node   │ ─ S101
└─────────────────────────────────────────────┘
                      │
                      ▼
┌─────────────────────────────────────────────┐
│  Parse the message, to obtain a neighbor    │
│  relationship between at least two network  │ ─ S102
│      nodes involved in the message          │
└─────────────────────────────────────────────┘
```

(56) References Cited

U.S. PATENT DOCUMENTS

| | | | |
|---|---|---|---|
| 2009/0047950 A1* | 2/2009 | Doppler | H04W 48/14 455/435.1 |
| 2010/0254471 A1 | 10/2010 | Ko et al. | |
| 2011/0136517 A1* | 6/2011 | Seppalainen | H04W 68/02 455/458 |
| 2011/0165878 A1* | 7/2011 | Nylander | H04J 11/0069 455/436 |
| 2012/0140697 A1* | 6/2012 | Chen | H04W 28/06 370/315 |
| 2012/0252451 A1* | 10/2012 | Knauft | H04W 8/06 455/436 |
| 2013/0005340 A1* | 1/2013 | Drazynski | H04W 8/186 455/436 |
| 2013/0267235 A1* | 10/2013 | Aoyagi | H04W 36/0083 455/444 |
| 2015/0080034 A1 | 3/2015 | Xi et al. | |

FOREIGN PATENT DOCUMENTS

| | | |
|---|---|---|
| CN | 102835162 A | 12/2012 |
| EP | 0 895 435 A1 | 2/1999 |
| EP | 2 345 279 B1 | 5/2013 |
| EP | 2858434 A2 | 4/2015 |
| WO | WO 2005/086379 A1 | 9/2005 |
| WO | 2012126437 A2 | 9/2012 |

* cited by examiner

METHOD AND APPARATUS FOR OBTAINING NEIGHBOR RELATIONSHIP BETWEEN NETWORK NODES AND NETWORK DEVICE

CROSS-REFERENCE TO RELATED APPLICATIONS

This application is a continuation of International Application No. PCT/CN2013/071494, filed on Feb. 7, 2013, which is hereby incorporated by reference in its entirety.

TECHNICAL FIELD

The present invention relates to the field of communications technologies, and in particular, to a method and an apparatus for obtaining a neighbor relationship between network nodes, and a network device.

BACKGROUND

In a Long Term Evolution (Long Term Evolution, LTE) access network, according to the definition of the $3^{rd}$ Generation Partnership Project (The $3^{rd}$ Generation Partnership Project, 3GPP) protocol, there are two wireless states of a user in LTE: one is a connected state, and in this case, a wireless connection exists between user equipment and a mobile network, extra signaling interaction between an external data network and the user equipment is not needed, and an uplink or downlink packet can be sent; the other is an idle state, and in this case, no wireless connection exists between the user equipment and the mobile network, when needing to interact with the external data network, the user equipment needs to first establish a wireless connection by using a service request (Service Request) process, and after a bearer is restored, the user equipment can perform a data service; when an external data network needs to communicate with the user equipment, after a packet sent by the external data network to user equipment in an idle state reaches a serving gateway (Serving Gateway, SGW), the SWG may trigger, by using a downlink data notification (Downlink Data Notification) message, a mobility management entity (Mobility Management Entity, MME) to page the user equipment. Because a network defined by the 3GPP protocol does not learn information about a neighbor relationship between network nodes, the MME pages users in all eNodeB base stations in a tracking area list (Tracking Area List, TA LIST) area in which the user equipment is located last time, where the TA LIST includes one or more tracking areas (Tracking Area, TA) that correspond to dozens or hundreds of eNodeBs.

Because each paging involves hundreds of eNodeBs, frequent paging may bring great pressure to processing of the eNodeBs. In an MME defined by the 3GPP standard, the MME learns information about an eNodeB on which a user camps last time, information about a TA on which the user camps last time, and information about a TA List on which the user camps last time. Therefore, the MME may also page a user in the eNodeB on which the user camps last time or in the TA on which the user camps last time, to reduce a quantity of eNodeBs involved in the paging. Data of universal mobile telecommunications systems (Universal Mobile Telecommunications System, UMTS) of Hong Kong and Canada shows that a paging success rate in a cell on which user equipment camps last time is about 65%, and a paging success rate in a cell on which a user camps last time and a neighboring cell of the cell is about 90%. Cell coverage areas of eNodeBs of the UMTS and LTE are similar. In an LTE network, the MME pages a user only in a range of an eNodeB on which the user camps last time, and a success rate may only be 65% to 70%. However, when paging is performed in a TA range (30 to 50 eNodeBs), a quantity of eNodeBs involved in the paging is still large. In view of data of the UMTS, the MME pages a user in a small range, namely, the eNodeB on which the user camps last time and a neighboring eNodeB of the eNodeB, and a success rate being more than 90% may be obtained, which is a good trade-off between a paging range and a paging success rate.

However, in the prior art, a method for obtaining a neighbor relationship between eNodeBs by an MME is not provided, causing that the MME cannot better improve paging efficiency.

SUMMARY

A technical problem to be resolved in the present invention is to provide a method and an apparatus for obtaining a neighbor relationship between network nodes, and a network device, so that a wireless network learns a neighbor relationship between network nodes, thereby improving efficiency of performing a service between neighboring network nodes.

To resolve the foregoing technical problem, according to a first aspect, an embodiment of the present invention provides a method for obtaining a neighbor relationship between network nodes, including:

receiving a message sent by a network node; and parsing the message, to obtain a neighbor relationship between at least two network nodes involved in the message.

With reference to the first aspect, in a first possible implementation manner, the message is any one of the following: a message used for requesting handover of a network node serving user equipment, a message carrying extension information, and a user-defined message.

With reference to the first aspect, in a second possible implementation manner, the parsing the message, to obtain a neighbor relationship between at least two network nodes involved in the message includes:

obtaining a first network node that sends the message;

obtaining a second network node included in the message; and obtaining a neighbor relationship between the first network node and the second network node, where the message is used for requesting handover of a network node serving user equipment.

With reference to the first aspect, in a third possible implementation manner, the parsing the message, to obtain a neighbor relationship between at least two network nodes involved in the message includes:

obtaining, according to extension information carried in the message, a neighbor relationship, included in the extension information, between two network nodes.

With reference to the third possible implementation manner of the first aspect, in a fourth possible implementation manner, the message further carries an identifier used for indicating that the message is a neighbor relationship reporting message.

With reference to the first aspect, in a fifth possible implementation manner, the parsing the message, to obtain a neighbor relationship between at least two network nodes involved in the message includes:

parsing a received user-defined message, to obtain a neighbor relationship, reported in the user-defined message, between two network nodes.

With reference to the fourth possible implementation manner of the first aspect or the fifth possible implementation manner of the first aspect, in a sixth possible implementation manner, after the parsing the message, to obtain a neighbor relationship between at least two network nodes involved in the message, the method further includes:

sending a confirmation message to the network node that sends the message.

According to a second aspect, an embodiment of the present invention provides an apparatus for obtaining a neighbor relationship between network nodes, including:

a receiving unit, configured to receive a message sent by a network node; and a first obtaining unit, configured to parse the message, to obtain a neighbor relationship between at least two network nodes involved in the message.

With reference to the second aspect, in a first possible implementation manner, the message is any one of the following: a message used for requesting handover of a network node serving user equipment, a message carrying extension information, and a user-defined message.

With reference to the second aspect, in a second possible implementation manner, the first obtaining unit includes:

a second obtaining unit, configured to obtain a first network node that sends the message;

a third obtaining unit, configured to obtain a second network node included in the message; and a fourth obtaining unit, configured to obtain a neighbor relationship between the first network node and the second network node, where the message is used for requesting handover of a network node serving user equipment.

With reference to the second aspect, in a third possible implementation manner, the first obtaining unit includes:

a fifth obtaining unit, configured to obtain, according to extension information carried in the message, a neighbor relationship, included in the extension information, between two network nodes.

With reference to the third possible implementation manner of the second aspect, in a fourth possible implementation manner, the message further carries an identifier used for indicating that the message is a neighbor relationship reporting message.

With reference to the second aspect, in a fifth possible implementation manner, the first obtaining unit includes:

a sixth obtaining unit, configured to parse a received user-defined message, to obtain a neighbor relationship, reported in the user-defined message, between two network nodes.

With reference to the fourth possible implementation manner of the second aspect or the fifth possible implementation manner of the second aspect, in a sixth possible implementation manner, the apparatus further includes:

a sending unit, configured to send a confirmation message to the network node that sends the message.

According to a third aspect, an embodiment of the present invention provides a network device, including: an input apparatus, an output apparatus, a memory, and a processor, where the processor performs the following steps:

receiving a message sent by a network node; and parsing the message, to obtain a neighbor relationship between at least two network nodes involved in the message.

With reference to the third aspect, in a first possible implementation manner, the message is any one of the following: a message used for requesting handover of a network node serving user equipment, a message carrying extension information, and a user-defined message.

With reference to the third aspect, in a second possible implementation manner, the step, performed by the processor, of parsing the message, to obtain a neighbor relationship between at least two network nodes involved in the message includes:

obtaining a first network node that sends the message;

obtaining a second network node included in the message; and obtaining a neighbor relationship between the first network node and the second network node, where the message is used for requesting handover of a network node serving user equipment.

With reference to the third aspect, in a third possible implementation manner, the step, performed by the processor, of parsing the message, to obtain a neighbor relationship between at least two network nodes involved in the message includes:

obtaining, according to extension information carried in the message, a neighbor relationship, included in the extension information, between two network nodes.

With reference to the third possible implementation manner of the third aspect, in a fourth possible implementation manner, the message further carries an identifier used for indicating that the message is a neighbor relationship reporting message.

With reference to the third aspect, in a fifth possible implementation manner, the step, performed by the processor, of parsing the message, to obtain a neighbor relationship between at least two network nodes involved in the message includes:

parsing a received user-defined message, to obtain a neighbor relationship, reported in the user-defined message, between two network nodes.

With reference to the fourth possible implementation manner of the third aspect or the fifth possible implementation manner of the third aspect, in a sixth possible implementation manner, after the processor performs the step of parsing the message, to obtain a neighbor relationship between at least two network nodes involved in the message, the processor further performs the following step:

sending a confirmation message to the network node that sends the message.

By using the technical solutions of the method and the apparatus for obtaining a neighbor relationship between network nodes, and the network device provided in the present invention, according to a message sent by a network node, a core network learns a neighbor relationship between network nodes, and efficiency of performing a service between neighboring network nodes may be improved by using the neighbor relationship.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The following provides detailed description separately by using specific embodiments.

Figure 1:
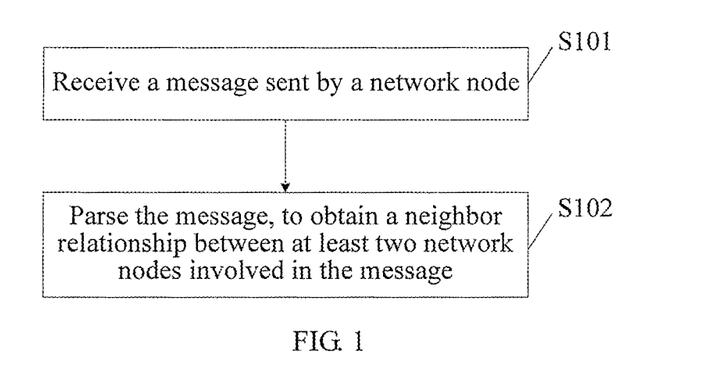
FIG. 1 is a method flowchart of an embodiment of a method for obtaining a neighbor relationship between network nodes according to the present invention.

FIG. 1 is a method flowchart of an embodiment of a method for obtaining a neighbor relationship between network nodes according to the present invention. As shown in FIG. 1, the method includes:

Step S101: Receive a message sent by a network node.

A wireless access network and a core network exchanges related messages. The core network receives a message sent by a network node in the wireless access network, for example, in an LTE network, a network element of the core network, namely, an MME, receives a message sent by an eNodeB. The message may be any one of the following: a message used for requesting handover of a network node serving user equipment, a message carrying extension information, and a user-defined message.

The message includes at least one network node to which the network node that sends the message points or includes the network node that sends the message and at least one other network node, where the network node may be identified by using an identification code.

Step S102: Parse the message, to obtain a neighbor relationship between at least two network nodes involved in the message.

The core network parses the message. If the message is a message used for requesting handover of a network node serving user equipment, first, the core network obtains an identification code, included in the message, of one network node to which handover points, and then obtains an identification code of the other network node that sends the message. Because handover definitely occurs between two neighboring network nodes, the core network obtains a neighbor relationship between the two network nodes. If the message is a message carrying extension information, it indicates that the message is used for performing configuration on neighboring network nodes, or if the extension information further carries an identifier, it indicates that the message is used for reporting the neighbor relationship; the neighbor relationship between the at least two network nodes may be obtained from the identification codes, included in the extension information of the message, of the at least two network nodes. If the message is a user-defined message, it indicates that the message is used for reporting the neighbor relationship, and the message includes at least two network nodes involved in the neighbor relationship; the core network obtains the neighbor relationship between the at least two network nodes.

According to the foregoing steps, the core network gradually learns neighbor relationships between network nodes in an entire network, and efficiency of performing a service between neighboring network nodes may be improved by using the neighbor relationship, for example, learning the neighbor relationship between the network nodes is very beneficial to optimization of a paging range. In the LTE network, the MME pages a user only in a range of an eNodeB on which the user camps last time, and a success rate may only be 65% to 70%. However, when paging is performed in a TA range (30 to 50 eNodeBs), a quantity of eNodeBs involved in the paging is still large. In view of data of a UMTS, the MME pages a user in a relatively small range, namely, the eNodeB on which the user camps last time and a neighboring eNodeB of the eNodeB, and a success rate being more than 90% may be obtained, which is a good trade-off between a paging range and a paging success rate. Learning a neighbor relationship between network nodes is also very beneficial to improving efficiency of other services involving neighboring network nodes.

By using the method for obtaining a neighbor relationship between network nodes provided in this embodiment of the present invention, according to a message sent by a network node, a core network learns a neighbor relationship between network nodes, and efficiency of performing a service between neighboring network nodes may be improved by using the neighbor relationship.

Figure 2:
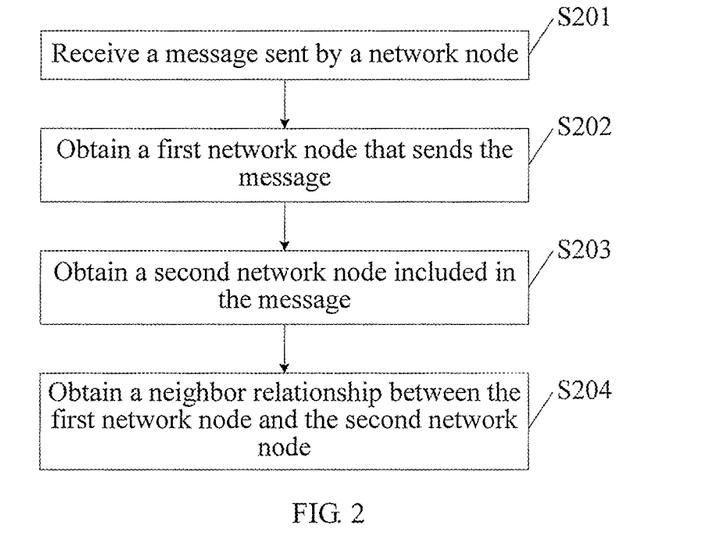
FIG. 2 is a method flowchart of a specific implementation manner of an embodiment of a method for obtaining a neighbor relationship between network nodes according to the present invention.

FIG. 2 is a method flowchart of a specific implementation manner of an embodiment of a method for obtaining a neighbor relationship between network nodes according to the present invention. As shown in FIG. 2, the method includes:

Step S201: Receive a message sent by a network node.

Step S202: Obtaining a first network node that sends the message.

Step S203: Obtain a second network node included in the message.

Step S204: Obtain a neighbor relationship between the first network node and the second network node.

When a network node serving user equipment needs to be handed over, the message sent by the first network node is received, where the message includes the second network node to which the network node that sends the message points, and the network node may be identified by using an identification code. The first network node that sends the message may be a source network node, and the second network node included in the message is a destination network node. On the contrary, the first network node that sends the message may be a destination network node, and the second network node included in the message is a source network node. After receiving the message, first, a core network obtains an identification code, included in the message, of the second network node to which handover points, and then obtains an identification code of the first network node that sends the message. Because handover definitely occurs between two neighboring network nodes, the core network obtains an neighbor relationship between the two network nodes.

In this implementation manner, a core network element is required to automatically learn the neighbor relationship between the network nodes according to an existing process without the need of proprietary extension of a message or a proprietary message. An LTE network is used as an example for description: in the LTE network, the 3GPP protocol specifies that user equipment in a connected state needs to perform handover (HANDOVER) when moving between eNodeBs. By using a HANDOVER process, caused by movement of a user in a connected state, of 3GPP standards, the MME may learn a relationship between neighboring eNodeBs. With the movement of a large quantity of users in a connected state, the MME may gradually learn neighbor relationships between eNodeBs in an entire network. The GPP defines two handover scenarios:

a first scenario: an X2-based handover (X2-BASED HANDOVER), where an X2 interface exists between neighboring eNodeBs; and a second scenario: an S1-based handover (S1-BASED HANDOVER), where no X2 interface exists between neighboring eNodeBs.

The following describes in detail that a network element of the core network, namely, an MME, learns the neighbor relationship between the eNodeBs in the two scenarios respectively.

Figure 3:
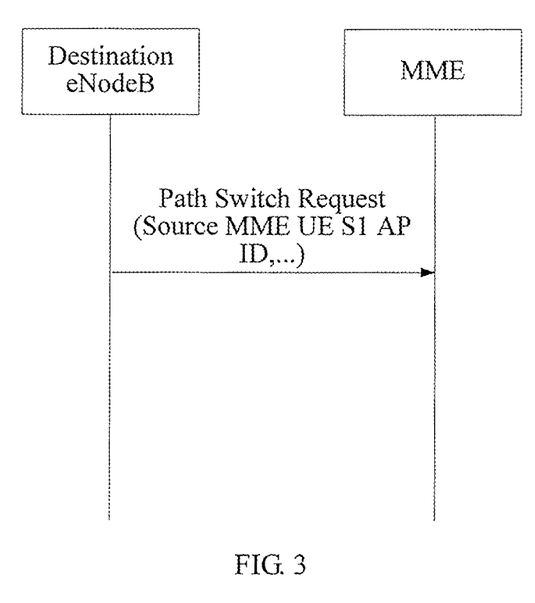
FIG. 3 is a schematic diagram based on an X2-BASED HANDOVER process.

The first scenario: the neighbor relationship between the eNodeBs is learnt based on an X2-BASED HANDOVER process.

The 3GPP 23.401 defines that the X2-BASED HANDOVER process occurs when a terminal in a connected state moves between neighboring eNodeBs having the X2 interfaces if the MME is not changed.

A destination eNodeB sends "Path Switch Request" signaling to the MME to initiate a handover process.

A process in which the MME learns the neighbor relationship between the eNodeBs in the first scenario is as follows: as shown in a schematic diagram based on an X2-BASED HANDOVER process in FIG. 3, a "Path Switch Request" message definitely carries a "Source MME UE S1AP ID" information element, and the MME may find, according to a numerical value of the information element, a context of an "MME UE S1AP ID" having a same numerical value. The context stores information about user equipment performing handover, an "eNodeB Address in Use" in the context is an IP address of a source eNodeB, and the MME finds an identification code of the source eNodeB according to the IP address. However, the "Path Switch Request" signaling is from the destination eNodeB, and after receiving the signaling, the MME may use the eNodeB that sends the signaling as the destination eNodeB, and find an identification code of the destination eNodeB according to the IP address. The MME knows that the handover process definitely occurs between two neighboring eNodeBs, and therefore, the MME learns a neighbor relationship between the source eNodeB and the destination eNodeB.

Figure 4:
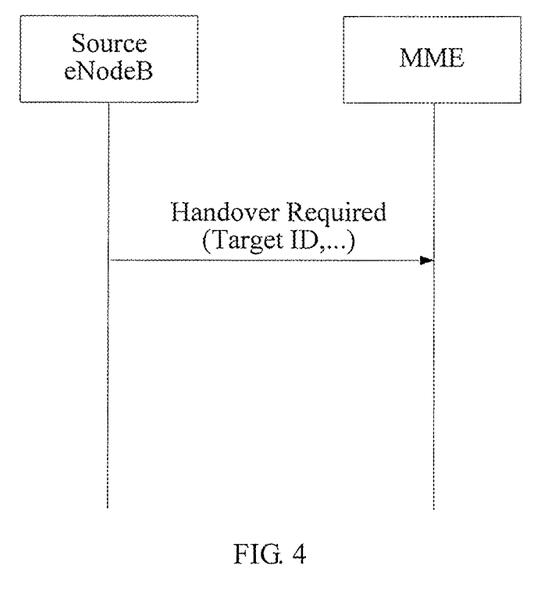
FIG. 4 is a schematic diagram based on an S1-BASED HANDOVER process.

The second scenario: the neighbor relationship between the eNodeBs is learnt based on an S1-BASED HANDOVER process.

The 3GPP 23.401 defines that the S1-BASED HANDOVER process occurs when the terminal in the connected state cannot move between neighboring eNodeBs in the X2-BASED HANDOVER (when the user in the connected state moves between two eNodeBs, no X2 interface exists between the eNodeBs, or handover by using an X2 interface cannot be performed). Both the MME and an SGW may be changed (referring to description of a 3GPP 23.401 S1-BASED HANDOVER message process).

The source eNodeB sends "Handover Required" signaling to the MME to initiate the S1-BASED HANDOVER process. For an S1-BASED HANDOVER between the MMEs (Inter-MME), because MMEs accessed by the neighboring eNodeBs are different, cross-MME paging cannot be performed when paging is performed, and therefore, there is no need to consider learning of the neighbor relationship between the eNodeBs in this scenario; for the S1-BASED HANDOVER in the MME (Intra-MME), the neighbor relationship between the eNodeBs between which the S1-BASED HANDOVER occurs needs to be learnt.

A process in which the MME learns the neighbor relationship between the eNodeBs in the second scenario is as follows: as shown in a schematic diagram based on the S1-BASED HANDOVER process in FIG. 4, the "Handover Required" signaling is from the source eNodeB, and after receiving the signaling, the MME may use the eNodeB that sends the signaling as the source eNodeB, and find the identification code of the source eNodeB according to the IP address; while, a destination identification code in the "Handover Required" signaling is the identification code of the destination eNodeB. The MME knows that the handover process definitely occurs between two neighboring eNodeBs, and therefore, the MME learns an neighbor relationship between the source eNodeB and the destination eNodeB.

According to a specific implementation manner of the method for obtaining an neighbor relationship between network nodes provided in this embodiment of the present invention, a core network may learn an neighbor relationship between network nodes by using an existing process of sending a handover message of a network node serving user equipment and without the need of a special message reporting process, and efficiency of performing a service between neighboring network nodes may be improved by using the neighbor relationship.

Figure 5:
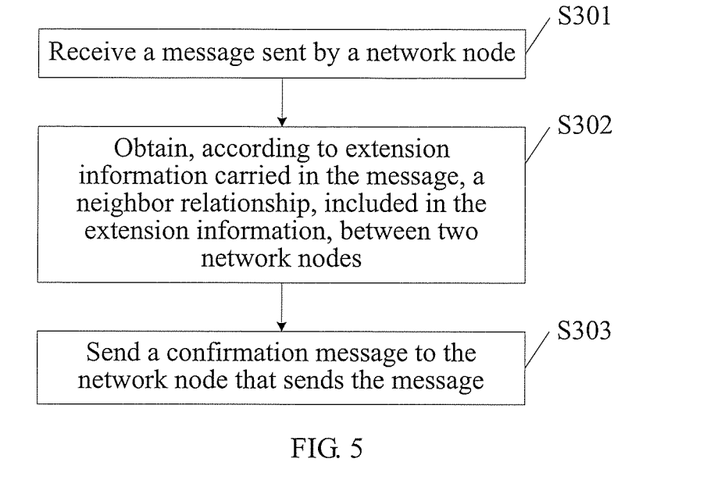
FIG. 5 is a method flowchart of another specific implementation manner of an embodiment of a method for obtaining a neighbor relationship between network nodes according to the present invention.

FIG. 5 is a method flowchart of another specific implementation manner of an embodiment of a method for obtaining a neighbor relationship between network nodes according to the present invention. As shown in FIG. 5, the method includes:

Step S301: Receive a message sent by a network node.

Step S302: Obtain, according to extension information carried in the message, a neighbor relationship, included in the extension information, between two network nodes.

Step S303: Send a confirmation message to the network node that sends the message.

In this implementation manner, a standard interface message is used, the message is a message carrying extension information, and it indicates that the message is used for performing configuration on neighboring network nodes; or if the extension information further carries an identifier used for indicating that the message is a neighbor relationship reporting message, a neighbor relationship between at least two network nodes may be obtained from identification codes, included in the extension information of the message, of the at least two network nodes.

If an original protocol between a core network and a wireless network does not have a confirmation message, it is not necessary to specially add a proprietary message to implement a confirmation function, that is, if the message is used for performing conventional configuration on neighboring network nodes, it is not necessary to send the confirmation message to the network node that sends the message; if the message carries the identifier used for indicating that the message is the neighbor relationship reporting message, the confirmation message may be sent to the network node that sends the message, to confirm that neighbor relationship reporting interaction succeeds.

Figure 6:
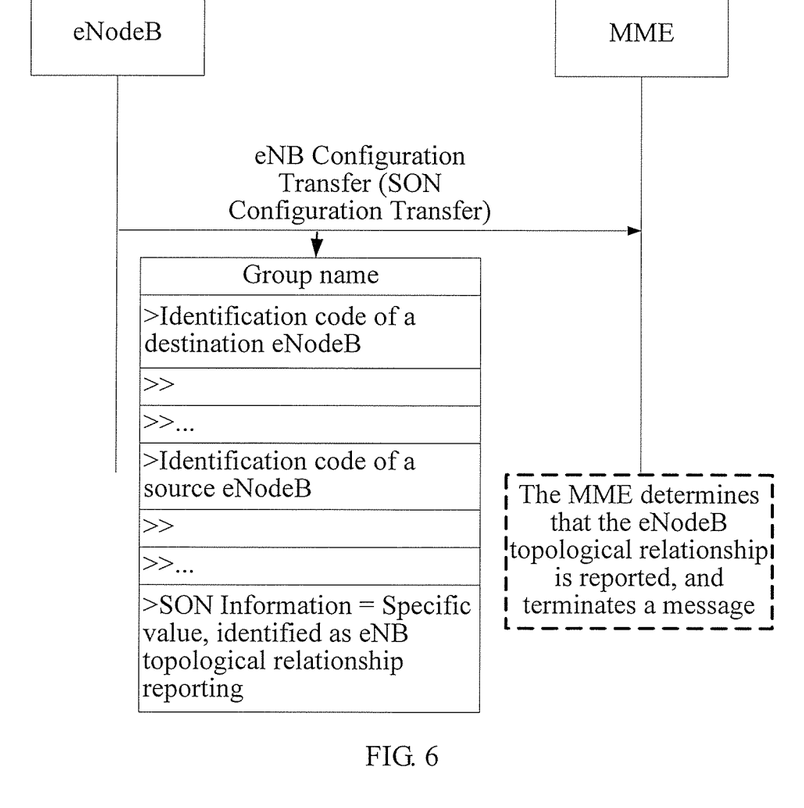
FIG. 6 is a schematic diagram of sending a message carrying extension information and an identifier to an MME by an eNodeB.

An LTE network is used as an example for description: as shown in a schematic diagram of sending the message carrying the extension information and the identifier to an MME by an eNodeB in FIG. 6, in the LTE network, the eNodeB may transmit configuration information between neighboring eNodeBs by using an "eNodeB Configuration Transfer" message, the message is forwarded by using the MME, and the MME may learn a relationship between neighboring eNodeBs according to the message.

However, in the case of an MME pool, the eNodeB sends the "eNodeB Configuration Transfer" message only to any MME in the MME pool, and other MMEs cannot learn a neighbor relationship between related eNodeBs. By setting "SON Information" of a "SON Configuration Transfer" field in the message to a specific value to identify the message as an eNodeB neighbor relationship reporting message, the eNodeB reports to all the MMEs in the MME pool, all the MMEs obtains information about the neighbor relationship by using the "eNodeB Configuration Transfer" message, the MME determines the message as wireless neighboring information reporting signaling, and the MME terminates the signaling, and does not forward the message to a target eNodeB.

After the eNodeB finds that the neighbor relationship is changed, a message needs to be sent to the MME to update the neighbor relationship between the eNodeBs.

In this implementation manner, the core network automatically learns the neighbor relationship between the network nodes by using an existing process without the need of a proprietary message. Therefore, a time of learning neighbor relationships between the network nodes in an entire network is short.

By using another specific implementation manner of the method for obtaining a neighbor relationship between network nodes provided in this embodiment of the present invention, a core network may learn a neighbor relationship between network nodes by using extension information carried in an existing message or an identifier carried in an existing message and used for indicating reporting of the neighbor relationship, and efficiency of performing a service between neighboring network nodes may be improved by using the neighbor relationship.

Figure 7:
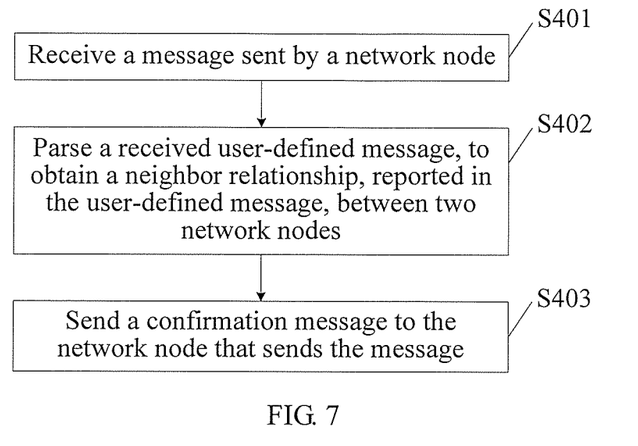
FIG. 7 is a method flowchart of still another specific implementation manner of an embodiment of a method for obtaining a neighbor relationship between network nodes according to the present invention.

FIG. 7 is a method flowchart of still another specific implementation manner of an embodiment of a method for obtaining a neighbor relationship between network nodes according to the present invention. As shown in FIG. 7, the method includes:

Step S401: Receive a message sent by a network node.

Step S402: Parse a received user-defined message, to obtain a neighbor relationship, reported in the user-defined message, between two network nodes.

Step S403: Send a confirmation message to the network node that sends the message.

In this implementation manner, network node neighboring reporting is performed by using a user-defined interface message, it indicates that the message is used for reporting a neighbor relationship, and the message includes at least two network nodes involved in the neighbor relationship. A core network obtains the neighbor relationship between the at least two network nodes. The core network and a wireless network may further add a confirmation message, to confirm that topology information reporting interaction succeeds. Therefore, a time of learning an entire wireless topological relationship is short.

Figure 8:
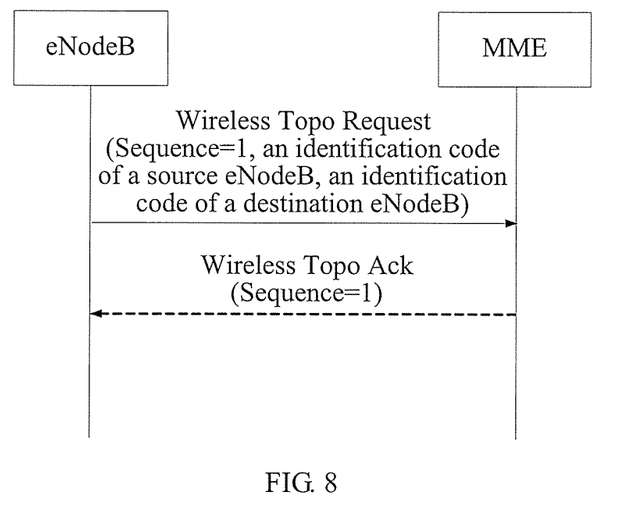
FIG. 8 is a schematic diagram of performing user-defined message interaction with an MME by an eNodeB.

An LTE network is used as an example for description: as shown in a schematic diagram in which an eNodeB performs user-defined message interaction with an MME in FIG. 8, in the LTE network, the eNodeB may separately send, to all MMEs in an MME pool by using a user-defined message such as a "Wireless Topo Request" message, user-defined messages reporting neighbor relationships, and the message carries:

a message sequence (Sequence): the MME adds the sequence in the confirmation message sent to the eNodeB, and the sequence identifies that a neighbor relationship corresponding to a sequence numerical value is reported successfully; and an identification code of a source eNodeB and an identification code of a destination eNodeB: neighboring eNodeBs in the wireless network, where the identification code of the source eNodeB refers to an ID of a reporting eNodeB, and the identification code of the destination eNodeB refers to an ID of an neighboring eNodeB.

After the eNodeB finds that the neighbor relationship is changed, a message needs to be sent to the MME to update the neighbor relationship between the eNodeBs.

By using still another specific implementation manner of the method for obtaining a neighbor relationship between network nodes provided in this embodiment of the present invention, a core network may learn a neighbor relationship between network nodes by receiving a user-defined message that is used for reporting the neighbor relationship between the network nodes and is sent by a network node, and efficiency of performing a service between neighboring network nodes may be improved by using the neighbor relationship.

Figure 9:
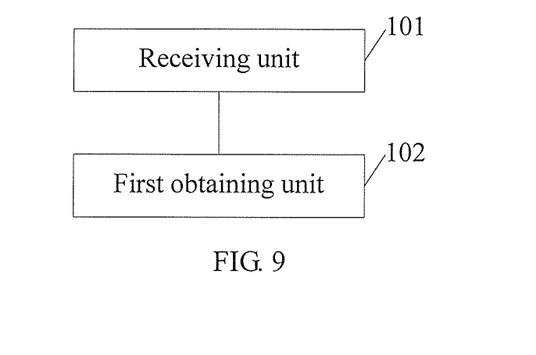
FIG. 9 is a schematic structural diagram of an embodiment of an apparatus for obtaining a neighbor relationship between network nodes according to the present invention.

FIG. 9 is a schematic structural diagram of an embodiment of an apparatus for obtaining a neighbor relationship between network nodes according to the present invention. As shown in FIG. 9, the apparatus includes: a receiving unit 101 and a first obtaining unit 102;

The receiving unit 101 is configured to receive a message sent by a network node.

A wireless access network and a core network exchanges related messages. The core network receives a message sent by a network node in the wireless access network, for example, in an LTE network, a network element of the core network, namely, an MME, receives a message sent by an eNodeB. The message may be any one of the following: a message used for requesting handover of a network node serving user equipment, a message carrying extension information, and a user-defined message.

The message includes at least one network node to which the network node that sends the message points or includes the network node that sends the message and at least one other network node, where the network node may be identified by using an identification code.

The first obtaining unit 102 is configured to parse the message, to obtain a neighbor relationship between at least two network nodes involved in the message.

The core network parses the message. If the message is a message used for requesting handover of a network node serving user equipment, first, the core network obtains an identification code, included in the message, of one network node to which handover points, and then, obtains an identification code of the other network node that sends the message. Because handover definitely occurs between two neighboring network nodes, the core network obtains a neighbor relationship between the two network nodes. If the message is a message carrying extension information, it indicates that the message is used for performing configuration on neighboring network nodes, or if the extension information further carries an identifier, it indicates that the message is used for reporting the neighbor relationship; the neighbor relationship between the at least two network nodes may be obtained from the identification codes, included in the extension information of the message, of the at least two network nodes. If the message is a user-defined message, it indicates that the message is used for reporting the neighbor relationship, and the message includes at least two network nodes involved in the neighbor relationship; the core network obtains the neighbor relationship between the at least two network nodes.

According to the foregoing embodiment, the core network gradually learns neighbor relationships between network nodes in an entire network, and efficiency of performing a service between neighboring network nodes may be improved by using the neighbor relationship, for example, learning the neighbor relationship between the network nodes is very beneficial to optimization of a paging range. In the LTE network, the MME pages a user only in a range of an eNodeB on which the user camps last time, and a success rate may only be 65% to 70%. However, when paging is performed in a TA range (30 to 50 eNodeBs), a quantity of eNodeBs involved in the paging is still large. In view of data of a UMTS, the MME pages a user in a relatively small range, namely, the eNodeB on which the user camps last time and an neighboring eNodeB of the eNodeB, and a success rate being more than 90% may be obtained, which is a good trade-off between a paging range and a paging success rate. Learning a neighbor relationship between network nodes is also very beneficial to improving efficiency of other services involving neighboring network nodes.

By using the apparatus for obtaining a neighbor relationship between network nodes provided in this embodiment of the present invention, according to a message sent by a network node, a core network learns a neighbor relationship between network nodes, and efficiency of performing a service between neighboring network nodes may be improved by using the neighbor relationship.

Figure 10:
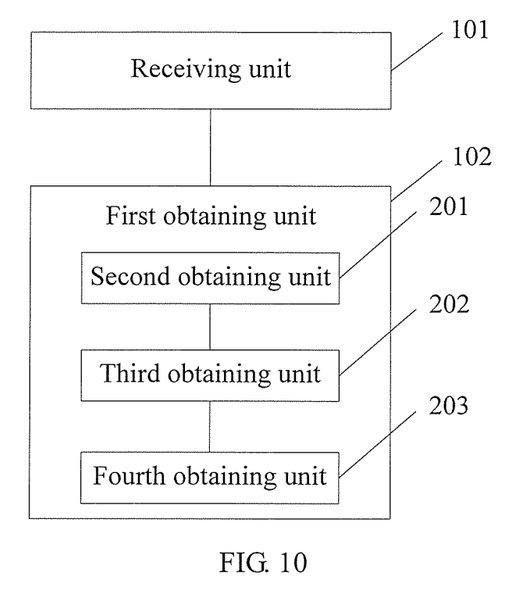
FIG. 10 is a schematic structural diagram of a specific implementation manner of an embodiment of an apparatus for obtaining a neighbor relationship between network nodes according to the present invention.

FIG. 10 is a schematic structural diagram of a specific implementation manner of an embodiment of an apparatus for obtaining a neighbor relationship between network nodes according to the present invention. As shown in FIG. 10, the apparatus includes:

a receiving unit 101, configured to receive a message sent by a network node; and a first obtaining unit 102, configured to parse the message, to obtain a neighbor relationship between at least two network nodes involved in the message, where in this implementation manner, the first obtaining unit 102 may include: a second obtaining unit 201, a third obtaining unit 202, and a fourth obtaining unit 203.

The second obtaining unit 201 is configured to obtain a first network node that sends the message.

The third obtaining unit 202 is configured to obtain a second network node included in the message.

The fourth obtaining unit 203 is configured to obtain a neighbor relationship between the first network node and the second network node.

When a network node serving user equipment needs to be handed over, the message sent by the first network node is received, where the message includes the second network node to which the network node that sends the message points, and the network node may be identified by using an identification code. The first network node that sends the message may be a source network node, and the second network node included in the message is a destination network node. On the contrary, the first network node that sends the message may be a destination network node, and the second network node included in the message is a source network node. After receiving the message, first, a core network obtains an identification code, included in the message, of the second network node to which handover points, and then, obtains an identification code of the first network node that sends the message. Because handover definitely occurs between two neighboring network nodes, the core network obtains a neighbor relationship between the two network nodes.

In this implementation manner, a core network element is required to automatically learn the neighbor relationship between the network nodes according to an existing process without the need of proprietary extension of a message or a proprietary message. An LTE network is used as an example for description: in the LTE network, the 3GPP protocol specifies that user equipment in a connected state needs to perform handover (HANDOVER) when moving between eNodeBs. By using a HANDOVER process, caused by movement of a user in a connected state, of 3GPP standards, the MME may learn a relationship between neighboring eNodeBs. With the movement of a large quantity of users in a connected state, the MME may gradually learn neighbor relationships between eNodeBs in an entire network. The 3GPP defines two handover scenarios:

a first scenario: an X2-based handover (X2-BASED HANDOVER), where an X2 interface exists between neighboring eNodeBs; and a second scenario: an S1-based handover (S1-BASED HANDOVER), where no X2 interface exists between neighboring eNodeBs.

The following describes in detail that a network element of the core network, namely, an MME, learns the neighbor relationship between the eNodeBs in the two scenarios respectively.

The first scenario: the neighbor relationship between the eNodeBs is learnt based on an X2-BASED HANDOVER process.

The 3GPP 23.401 defines that the X2-BASED HANDOVER process occurs when a terminal in a connected state moves between neighboring eNodeBs having the X2 interfaces if the MME is not changed.

A destination eNodeB sends "Path Switch Request" signaling to the MME to initiate a handover process.

A process in which the MME learns the neighbor relationship between the eNodeBs in the first scenario is as follows: as shown in a schematic diagram based on an X2-BASED HANDOVER process in FIG. 3, a "Path Switch Request" message definitely carries a "Source MME UE S1AP ID" information element, and the MME may find, according to a numerical value of the information element, a context of an "MME UE S1AP ID" having a same numerical value. The context stores information about user equipment performing handover, an "eNodeB Address in Use" in the context is an IP address of a source eNodeB, and the MME finds an identification code of the source eNodeB according to the IP address. However, the "Path Switch Request" signaling is from the destination eNodeB, and after receiving the signaling, the MME may use the eNodeB that sends the signaling as the destination eNodeB, and find an identification code of the destination eNodeB according to the IP address. The MME knows that the Handover process definitely occurs between two neighboring eNodeBs, and therefore, the MME learns a neighbor relationship between the source eNodeB and the destination eNodeB.

The second scenario: the neighbor relationship between the eNodeBs is learnt based on an S1-BASED HANDOVER process.

The 3GPP 23.401 defines that the S1-BASED HANDOVER process occurs when the terminal in the connected state cannot move between neighboring eNodeBs in the X2-BASED HANDOVER (when the user in the connected state moves between two eNodeBs, no X2 interface exists between the eNodeBs, or handover by using an X2 interface cannot be performed). Both the MME and an SGW may be changed (referring to description of a 3GPP 23.401 S1-BASED HANDOVER message process).

The source eNodeB sends "Handover Required" signaling to the MME to initiate the S1-BASED HANDOVER process. For an S1-BASED HANDOVER between the MMEs (Inter-MME), because MMEs accessed by the neighboring eNodeBs are different, cross-MME paging cannot be performed when paging is performed, and therefore, there is no need to consider learning of the neighbor relationship between the eNodeBs in this scenario; for the S1-BASED HANDOVER in the MME (Intra-MME), the neighbor relationship between the eNodeBs between which the S1-BASED HANDOVER occurs needs to be learnt.

A process in which the MME learns the neighbor relationship between the eNodeBs in the second scenario is as follows: as shown in a schematic diagram based on the S1-BASED HANDOVER process in FIG. 4, the "Handover Required" signaling is from the source eNodeB, and after receiving the signaling, the MME may use the eNodeB that sends the signaling as the source eNodeB, and find the identification code of the source eNodeB according to the IP address; while, a destination identification code in the "Handover Required" signaling is the identification code of the destination eNodeB. The MME knows that the handover process definitely occurs between two neighboring eNodeBs, and therefore, the MME learns a neighbor relationship between the source eNodeB and the destination eNodeB.

According to a specific implementation manner of the apparatus for obtaining an neighbor relationship between network nodes provided in this embodiment of the present invention, a core network may learn a neighbor relationship between network nodes by using an existing process of sending a handover message of a network node serving user equipment and without the need of a special message reporting process, and efficiency of performing a service between neighboring network nodes may be improved by using the neighbor relationship.

Figure 11:
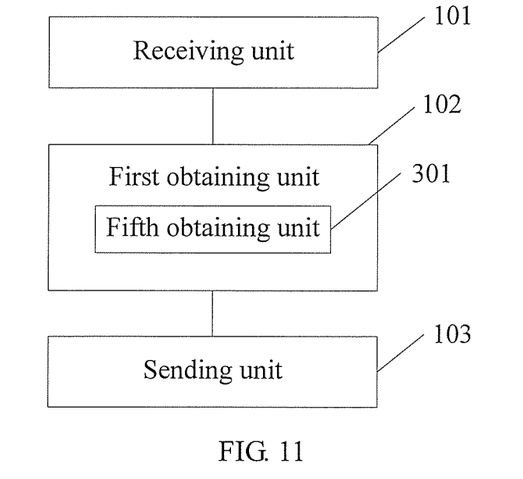
FIG. 11 is a schematic structural diagram of another specific implementation manner of an embodiment of an apparatus for obtaining a neighbor relationship between network nodes according to the present invention.

FIG. 11 is a schematic structural diagram of another specific implementation manner of an embodiment of an apparatus for obtaining a neighbor relationship between network nodes according to the present invention. As shown in FIG. 11, the apparatus includes:

a receiving unit 101, configured to receive a message sent by a network node; and a first obtaining unit 102, configured to parse the message, to obtain a neighbor relationship between at least two network nodes involved in the message, where, specifically, in this implementation manner, the first obtaining unit 102 includes a fifth obtaining unit 301.

The fifth obtaining unit 301 is configured to obtain, according to extension information carried in the message, the neighbor relationship, included in the extension information, between two network nodes.

The apparatus may further include:

a sending unit 103 is configured to send a confirmation message to the network node that sends the message.

In this implementation manner, a standard interface message is used, the message is a message carrying extension information, and it indicates that the message is used for performing configuration on neighboring network nodes; or if the extension information further carries an identifier used for indicating that the message is a neighbor relationship reporting message, a neighbor relationship between at least two network nodes may be obtained from identification codes, included in the extension information of the message, of the at least two network nodes.

If an original protocol between a core network and a wireless network does not have a confirmation message, it is not necessary to specially add a proprietary message to implement a confirmation function, that is, if the message is used for performing conventional configuration on neighboring network nodes, it is not necessary to send the confirmation message to the network node that sends the message; if the message carries the identifier used for indicating that the message is the neighbor relationship reporting message, it may be chosen to send the confirmation message to the network node that sends the message, to confirm that neighbor relationship reporting interaction succeeds.

An LTE network is used as an example for description: as shown in a schematic diagram of sending the message carrying the extension information and the identifier to an MME by an eNodeB in FIG. 6, in the LTE network, the eNodeB may transmit configuration information between neighboring eNodeBs by using an "eNodeB Configuration Transfer" message, the message is forwarded by using the MME, and the MME may learn a relationship between neighboring eNodeBs according to the message.

However, in the case of an MME pool, the eNodeB sends the "eNodeB Configuration Transfer" message only to any MME in the MME pool, and other MMEs cannot learn a neighbor relationship between related eNodeBs. By setting "SON Information" of a "SON Configuration Transfer" field in the message to a specific value, and identifying the specific value as an eNodeB neighbor relationship reporting message, the eNodeB reports to all the MMEs in the MME pool, all the MMEs obtains information about the neighbor relationship by using the "eNodeB Configuration Transfer" message, the MME determines the message as wireless neighboring information reporting signaling, and the MME terminates the signaling, and does not forward the message to a target eNodeB.

After the eNodeB finds that the neighbor relationship is changed, a message needs to be sent to the MME to update the neighbor relationship between the eNodeBs.

In this embodiment, the core network automatically learns the neighbor relationship between the network nodes by using an existing process without the need of a proprietary message. Therefore, a time of learning neighbor relationships between the network nodes in an entire network is short.

By using another specific implementation manner of the apparatus for obtaining a neighbor relationship between network nodes provided in this embodiment of the present invention, a core network may learn a neighbor relationship between network nodes by using extension information carried in an existing message or an identifier carried in an existing message and used for indicating reporting of the neighbor relationship, and efficiency of performing a service between neighboring network nodes may be improved by using the neighbor relationship.

Figure 12:
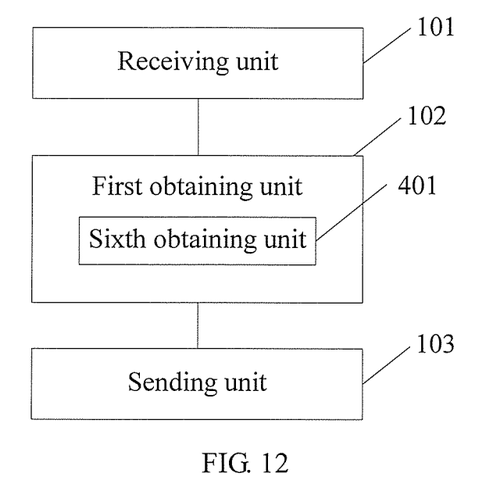
FIG. 12 is a schematic structural diagram of still another specific implementation manner of an embodiment of an apparatus for obtaining a neighbor relationship between network nodes according to the present invention.

FIG. 12 is a schematic structural diagram of still another specific implementation manner of an embodiment of an apparatus for obtaining a neighbor relationship between network nodes according to the present invention. As shown in FIG. 12, the apparatus includes:

a receiving unit 101, configured to receive a message sent by a network node; and a first obtaining unit 102, configured to parse the message, to obtain a neighbor relationship between at least two network nodes involved in the message, where specifically, in this implementation manner, the first obtaining unit 102 includes a sixth obtaining unit 401.

The sixth obtaining unit 401 is configured to parse a received user-defined message, to obtain a neighbor relationship, reported in the user-defined message, between two network nodes.

The apparatus may further include:

a sending unit 103, configured to send a confirmation message to the network node that sends the message.

In this embodiment, a neighbor relationship between network nodes are reported by using a user-defined interface message, it indicates that the message is used for reporting the neighbor relationship, and the message includes at least two network nodes involved in the neighbor relationship. A core network obtains the neighbor relationship between the at least two network nodes. The core network and a wireless network may further add a confirmation message, to confirm that topology information reporting interaction succeeds. Therefore, a time of learning an entire wireless topological relationship is short.

An LTE network is used as an example for description: as shown in a schematic diagram in which an eNodeB performs user-defined message interaction with an MME in FIG. 8, in the LTE network, the eNodeB may separately send, to all MMEs in an MME pool by using a user-defined message such as a "Wireless Topo Request" message, user-defined messages reporting neighbor relationships, and the message carries:

a message sequence (Sequence): the MME adds the sequence in the confirmation message sent to the eNodeB, and the sequence identifies that a neighbor relationship corresponding to a sequence numerical value is reported successfully; and an identification code of a source eNodeB and an identification code of a destination eNodeB: neighboring eNodeBs in the wireless network, where the identification code of the source eNodeB refers to an ID of a reporting eNodeB, and the identification code of the destination eNodeB refers to an ID of an neighboring eNodeB.

After the eNodeB finds that the neighbor relationship is changed, a message needs to be sent to the MME to update the neighbor relationship between the eNodeBs.

By using still another specific implementation manner of the method for obtaining a neighbor relationship between network nodes provided in this embodiment of the present invention, a core network may learn a neighbor relationship between network nodes by receiving a user-defined message that is used for reporting the neighbor relationship between the network nodes and is sent by a network node, and efficiency of performing a service between neighboring network nodes may be improved by using the neighbor relationship.

Figure 13:
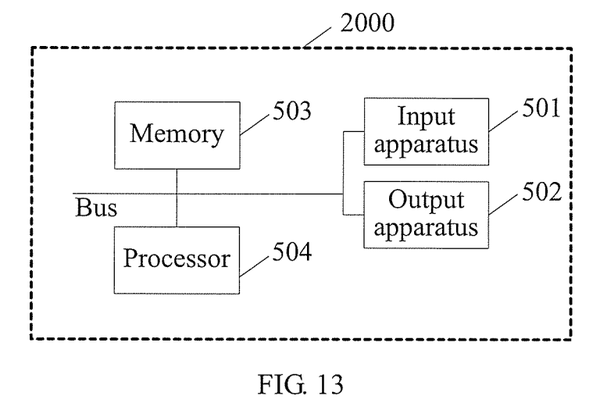
FIG. 13 is a schematic structural diagram of an embodiment of a network device according to the present invention.

FIG. 13 is a schematic structural diagram of an embodiment of a network device according to the present invention. As shown in FIG. 13, the network device 2000 may include:

an input apparatus 501, an output apparatus 502, a memory 503, and a processor 504 (there may be one or more processors 504 in the network device, and one processor is used as an example in FIG. 13), where, in some embodiments of the present invention, the input apparatus 501, the output apparatus 502, the memory 503, and the processor 504 may be connected by using a bus or in another manner, and an example in which connection is performed by using the bus is used in FIG. 13.

The processor 504 performs the following steps:

receiving a message sent by a network node; and parsing the message, to obtain a neighbor relationship between at least two network nodes involved in the message, where the message is any one of the following: a message used for requesting handover of a network node serving user equipment, a message carrying extension information, and a user-defined message.

As an implementation manner, the processor 504 performing the step of parsing the message, to obtain a neighbor relationship between at least two network nodes involved in the message may include:

obtaining a first network node that sends the message;

obtaining a second network node included in the message; and obtaining a neighbor relationship between the first network node and the second network node, where the message is used for requesting handover of a network node serving user equipment.

As another implementation manner, the processor 504 performing the step of parsing the message, to obtain a neighbor relationship between at least two network nodes involved in the message may include:

parsing a received user-defined message, to obtain a neighbor relationship, reported in the user-defined message, between two network nodes.

As still another implementation manner, the processor 504 performing the step of parsing the message, to obtain a neighbor relationship between at least two network nodes involved in the message may include:

obtaining, according to extension information carried in the message, the neighbor relationship, included in the extension information, between two network nodes.

Optionally, the message further carries an identifier used for indicating that the message is an neighbor relationship reporting message.

Optionally, in the foregoing another implementation manner and still another implementation manner, after the processor 504 performs the step of parsing the message, to obtain a neighbor relationship between at least two network nodes involved in the message, the processor further performs the following step:

sending a confirmation message to the network node that sends the message.

It may be understood that, functions of various functional modules of the network device 2000 in this embodiment may be specifically implemented according to the method in the foregoing method embodiments, and for a specific implementation process, reference may be made to related description of the foregoing method embodiment, which is not described herein again.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also understand that the embodiments described in this specification all belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

A person of ordinary skill in the art may understand that all or a part of the steps of the methods in the embodiments may be implemented by a program instructing relevant hardware. The program may be stored in a computer readable storage medium. The storage medium may include: a read-only memory, a random-access memory, a magnetic disk, or an optical disc.

A method and an apparatus for obtaining a neighbor relationship between network nodes, and a network device provided in the embodiments of the present invention are described above in detail. In this specification, specific examples are used for illustrating principles and implementation manners of the present invention. The foregoing descriptions of the embodiments are merely used to help understand the methods and core ideas of the present invention. Meanwhile, a person of ordinary skill in the art may make modifications to the specific implementation manners and application scopes according to the idea of the present invention. In conclusion, the content of this specification should not be construed as a limitation on the present invention.

What is claimed is:

1. A method for obtaining a neighbor relationship between network nodes, the method comprising:
   receiving, by a core network, a message sent by a network node, wherein the message is an "eNodeB Configuration Transfer" message including a "SON Configuration Transfer" field, wherein a value of the "SON Configuration Transfer" field comprises an identifier for indicating that the message is a neighbor relationship reporting message;
   parsing, by the core network, at least one field of the "eNodeB Configuration Transfer" message, to obtain a neighbor relationship between at least two network nodes involved in the "eNodeB Configuration Transfer" message; and
   sending, by the core network, a confirmation message to the network node that sends the "eNodeB Configuration Transfer" message,
   wherein the at least one field of the "eNodeB Configuration Transfer" message comprises the "SON Configuration Transfer" field.

2. The method according to claim 1, wherein parsing the at least one field of the "eNodeB Configuration Transfer" message, to obtain a neighbor relationship between at least two network nodes involved in the "eNodeB Configuration Transfer" message comprises:
   obtaining a first network node that sends the "eNodeB Configuration Transfer" message;
   obtaining a second network node comprised in the "eNodeB Configuration Transfer" message; and
   obtaining a neighbor relationship between the first network node and the second network node.

3. The method according to claim 1, wherein parsing the at least one field of the "eNodeB Configuration Transfer" message, to obtain a neighbor relationship between at least two network nodes involved in the "eNodeB Configuration Transfer" message comprises:
   obtaining, according to extension information carried in the "eNodeB Configuration Transfer" message, a neighbor relationship, comprised in the extension information, between two network nodes.

4. The method according to claim 1, wherein:
   the core network is part of a MME pool comprising a plurality of MMEs, and
   the eNodeB configuration transfer message enables the plurality of MMEs of the MME pool to obtain information about the neighbor relationship.

5. The method according to claim 1, wherein the identifier of the "SON Configuration Transfer" field for indicating that the message is a neighbor relationship reporting message is stored in a "SON Information" element of the "SON Configuration Transfer" field.

6. A core network device, comprising:
   an input apparatus and an output apparatus;
   a memory; and
   a processor configured to:
      receive a message sent by a network node, wherein the message is an "eNodeB Configuration Transfer" message including a "SON Configuration Transfer" field, wherein a value of the "SON Configuration Transfer" field comprises an identifier for indicating that the "eNodeB Configuration Transfer" message is a neighbor relationship reporting message;
      parse at least one field of the "eNodeB Configuration Transfer" message, to obtain a neighbor relationship between at least two network nodes involved in the "eNodeB Configuration Transfer" message; and
      send a confirmation message to the network node that sends the "eNodeB Configuration Transfer" message,
      wherein the at least one field of the "eNodeB Configuration Transfer" message comprises the "SON Configuration Transfer" field.

7. The core network device according to claim 6, the processor is further configured to:
   obtain a first network node that sends the "eNodeB Configuration Transfer" message;
   obtain a second network node comprised in the "eNodeB Configuration Transfer" message; and
   obtain a neighbor relationship between the first network node and the second network node.

8. The core network device according to claim 6, wherein the processor is further configured to:
   obtain, according to extension information carried in the "eNodeB Configuration Transfer" message, a neighbor relationship, comprised in the extension information, between two network nodes.

9. The core network device according to claim 6, wherein:
   the core network device is part of a MME pool comprising a plurality of MMEs, and
   the eNodeB configuration transfer message enables the plurality of MMEs of the MME pool to obtain information about the neighbor relationship.

10. The core network device according to claim 6, wherein the identifier of the "SON Configuration Transfer" field for indicating that the message is a neighbor relationship reporting message is stored in a "SON Information" element of the "SON Configuration Transfer" field.

* * * * *